April 15, 1930.    C. MAUBORGNE    1,755,070
SWITCH MECHANISM
Filed Oct. 8, 1928    4 Sheets-Sheet 1
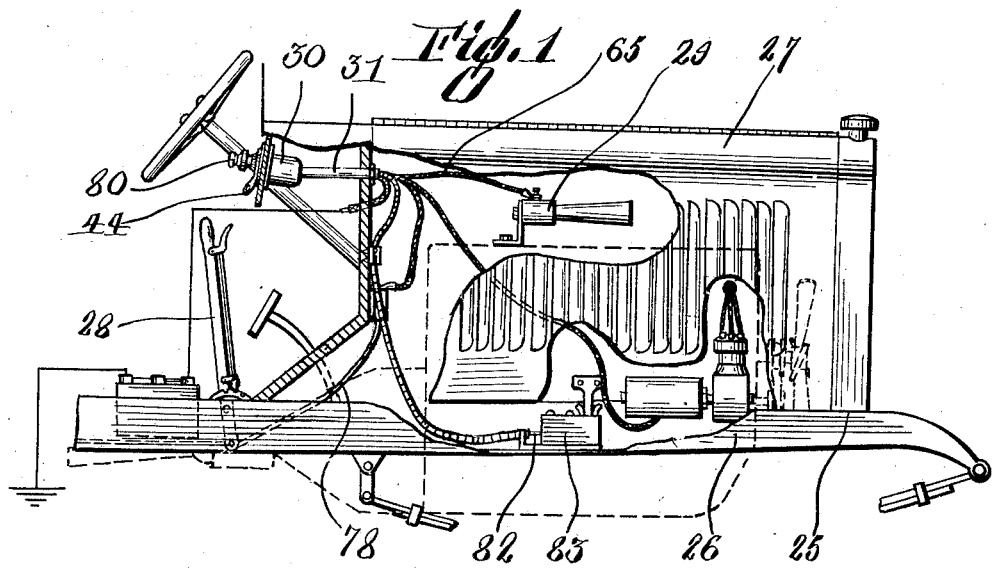
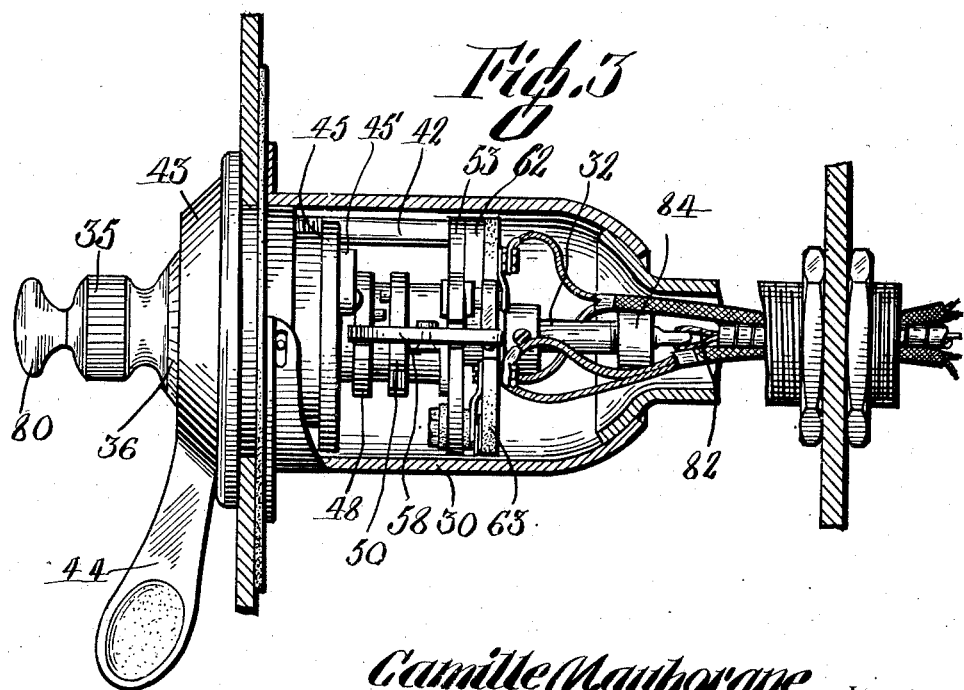
Camille Mauborgne  Inventor
By  *Marion & Marion*  Attorneys April 15, 1930.  C. MAUBORGNE  1,755,070
SWITCH MECHANISM
Filed Oct. 8, 1928  4 Sheets-Sheet 2
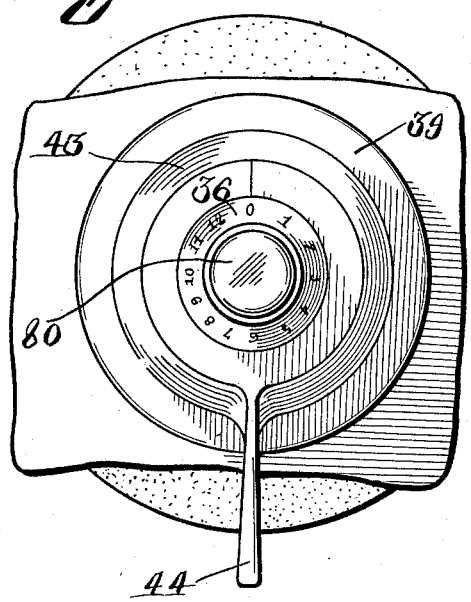
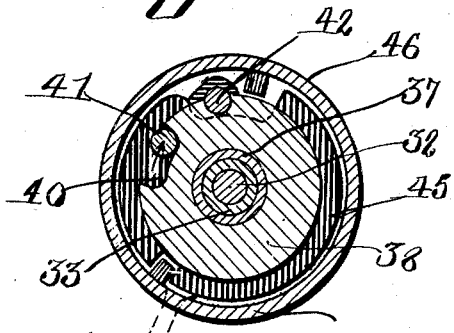
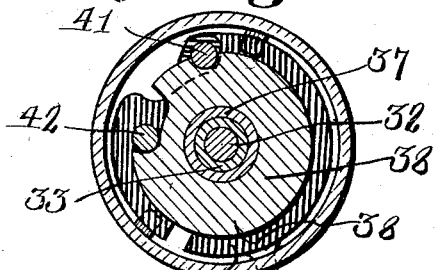
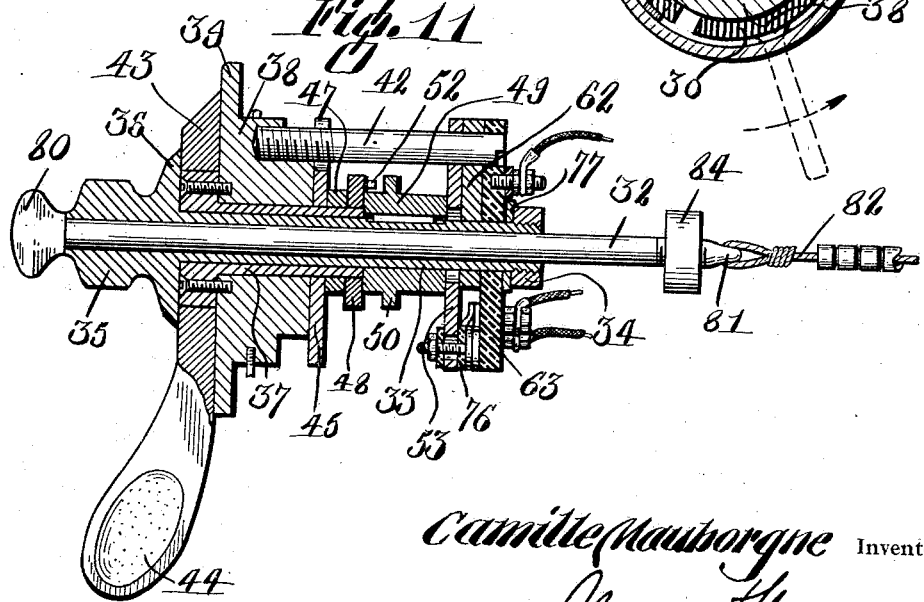
Camille Mauborgne Inventor
By Marion & Marion Attorneys

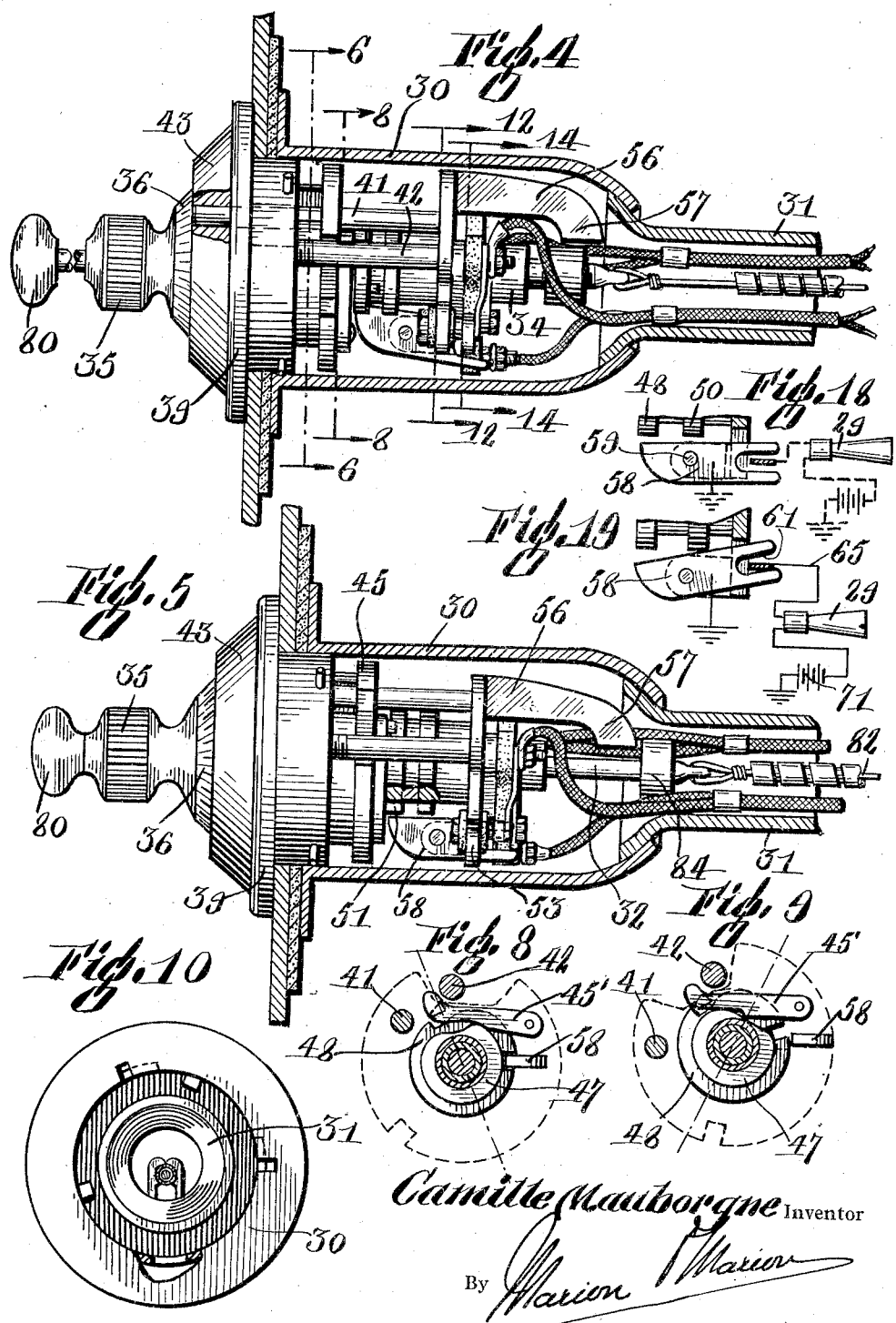

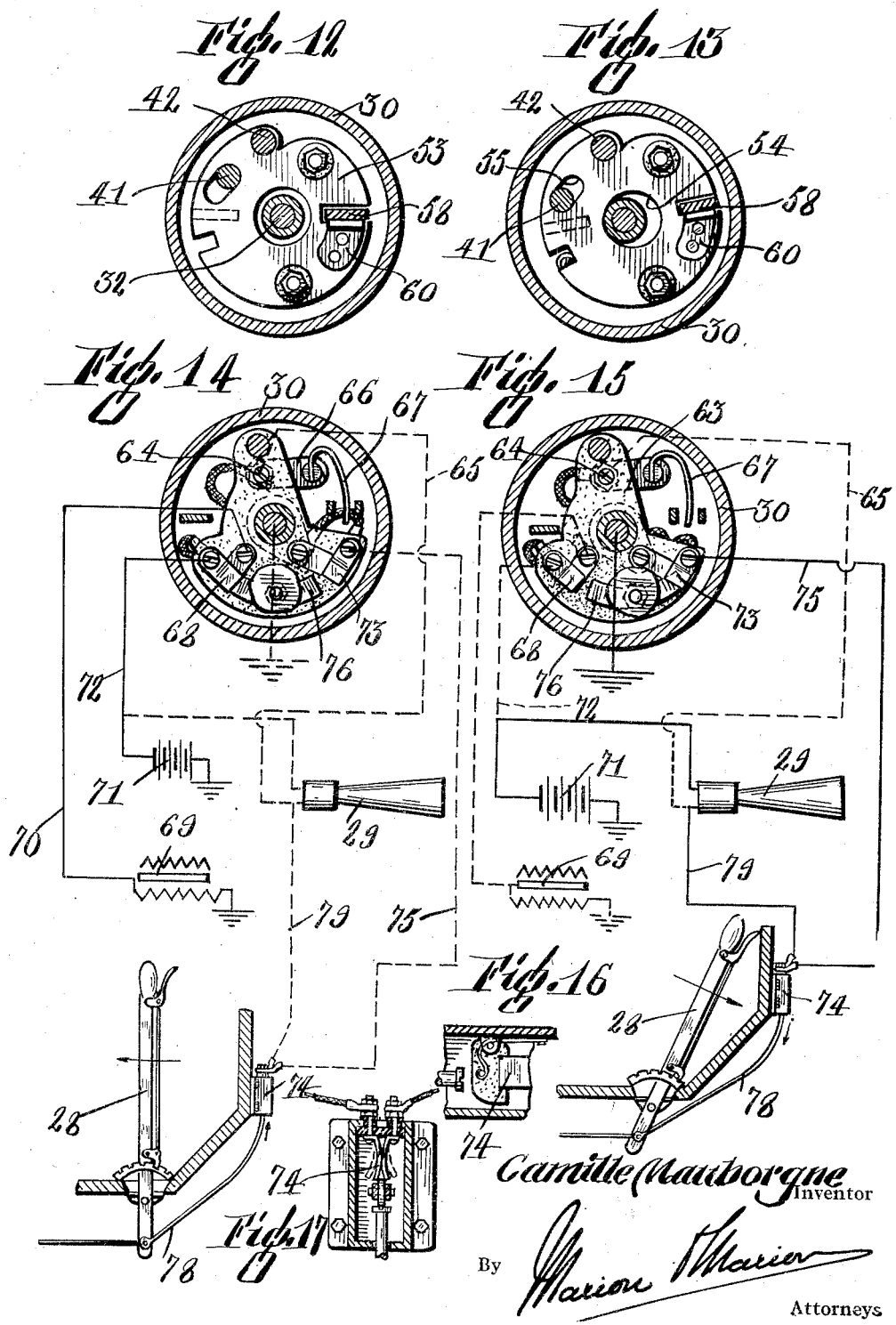

Patented Apr. 15, 1930

1,755,070

UNITED STATES PATENT OFFICE

CAMILLE MAUBORGNE, OF MONTREAL, QUEBEC, CANADA

SWITCH MECHANISM

Application filed October 8, 1928. Serial No. 311,133.

The present invention relates to improvements in switch mechanism having particular reference to a novel locking apparatus therefor.

The principal object of the present invention is to urge the driver of a vehicle to apply the emergency brakes and to lock his car before leaving the same thereby preventing the theft of his car or accidents in a grade.

An important object of the invention is the provision of a switch mechanism designed to prevent the theft of and tampering with motor vehicles.

A further object of the invention is the provision of a switch mechanism designed so that when unoccupied and locked any unauthorized attempt to operate the vehicle will cause the operation of an audible signal.

Another object of the invention is the provision of a switch mechanism constructed so that the vehicle hood can be securely locked.

Still another object of the invention is the provision of switch mechanism constructed so that any attempt to tamper with the lock emergency brake or with the switch locking mechanism will result in the sounding of a warning signal.

A further object of the invention is the provision of a switch mechanism of the above character designed to provide a safe locking apparatus for the ignition system.

A still further object of the invention is the provision of switch mechanism of the above character which will be compact in construction and reliable in operation.

Other objects and advantages of the invention will become apparent as the description progresses.

In the accompanying drawing forming a part of this specification and in which like reference characters are employed to designate corresponding parts throughout the same:

Figure 1 is a fragmentary side elevational view of a motor vehicle.

Figure 2 is a front elevational view of the switch mechanism mounted thereon.

Figure 3 is a side elevational view of the mechanism, partly in section.

Figure 4 is a plan view of the mechanism in unlocked position.

Figure 5 is a similar view in locked position.

Figure 6 is a transverse section taken on the line 6—6 of Figure 4.

Figure 7 is a similar view showing the mechanism in locked position.

Figure 8 is a section taken on the line 8—8 of Figure 4.

Figure 9 is a similar view in locked position.

Figure 10 is a rear end view of the casing.

Figure 11 is a longitudinal section through the operating mechanism.

Figure 12 is a section taken on the line 12—12 of Figure 4.

Figure 13 is a similar view in locked position.

Figure 14 is a section taken on the line 14—14 of Figure 4, with a diagram of the electric connections.

Figure 15 is a similar view in locked position.

Figure 16 is a longitudinal section through the brake switch.

Figure 17 is a transverse section through the same.

Figure 18 is an elevational view of the trigger member in unlocked position, and Figure 19 is a similar view in locked position.

Referring to the drawings, wherein for the purpose of illustration is shown a preferred embodiment of the invention, the numeral 25 generally designates a fragmentary portion of a motor vehicle embodying a frame 26 carrying on its forward end a suitable motor enclosed in a hood 27 having hingedly connected side sections. Adjacent the driver's seat is mounted a conventional type of emergency brake lever 28 designed to apply the brakes when the vehicle is at rest. Mounted within the hood, in any suitable position, is a suitable signal 29, preferably embodying an electrically operated horn.

Mounted horizontally on the instrument board of the vehicle, and projecting forwardly thereof, is a substantially cylindrical casing 30 having a forwardly projecting tubular extension 31 extending through the dash board. Mounted longitudinally through the centre of the casing 30 is a bolt 32 about the intermediate portion of which is rotatably positioned an elongated sleeve 33. The forward end of the sleeve is screw threaded to receive thereon a nut 34 fixed against rotatable movement. The rear end of the sleeve is provided with a circular knob 35 adjacent which is formed an annular graduated dial 36.

About the rear portion of the sleeve 33 is positioned a tubular bearing sleeve 37 formed at its rear end with an enlarged flange rigidly bolted to an end plate 38. The end plate 38 is projected through an opening in the instrument board of the vehicle and is formed with an annular enlarged flange 39 rigidly attached to the rear side thereof. The end plate 38 is formed with an arcuate, longitudinally extending recess 40 through which is extended a concentrically adjustable pin 41 extending axially through the plate. A rod 42 is arranged so that its forward end is attached to the periphery of the plate 38 and extends axially over the bolt 32.

An annular recessed ring 43 is rotatably mounted on the exterior flange of the tubular bearing 37 and is formed with a downwardly depending operating lever 44. The forward end of the adjustable pin 41 is rigidly secured to the ring 43 and is selectively adjusted thereby. An annular rotatable, relatively thin plate 45 is positioned over the tubular bearing 37 against the inner side of the rigid end plate 38. The plate 45 is formed with a circular opening adjacent its exterior periphery through which is projected the intermediate portion of the pin 41 and is also formed with an elongated recess 46 at its peripheral edge to clear the fixed rod 42. Against the inner surface of the rotatable plate 45 is positioned a loosely mounted spacing collar 47 disposed between the plate and a loosely rotatable flange 48 positioned over the inner end of the bearing 37.

Slidably fitted over the forward end of the sleeve 33, and preferably keyed thereon, is an exterior sleeve 49, the rear end abutting the flange 48 and the bearing 37. This sleeve 49 is provided with an enlarged annular flange 50 spaced from, and equal in diameter to the flange 48. The flanges 48 and 50 form complementary members provided with radially extending slots 51 and carrying inwardly projecting pins 52 designed to contact with one another upon rotary adjustment of the sleeve 49.

Abutting the forward end of the exterior sleeve 49 and positioned about the longitudinal sleeve 33 is an eccentrically adjustable plate 53 having an eccentric central opening 54 loosely disposed about the sleeve. Adjacent its periphery, the plate 53 is formed with a recess through which is extended the fixed rod 42. Adjacent this opening, the plate is also formed with a tangentially extending slot 55 adapted to receive therein the forward reduced end of the adjustable pin 41 by means of which the plate is selectively adjusted. A forwardly projecting arm 56 extends from the rear face of the plate 53 and is formed on its extremity with an inwardly disposed radial extension 57 adjustable radially with respect to the central bolt 32 at a position diametrically opposed to the arm 56. This plate is provided with a radial recess through which is longitudinally extended a trigger 58 fulcrumed intermediate its ends upon a pivot 59 supported by a bracket 60. The rear end of the trigger is arranged to operate radially to engage the slots 51 in the rotatable flanges 48 and 50 or disengage the same. The forward end of the trigger is bifurcated, as indicated at 61, the purpose of which will be later described.

Against the rear surface of the eccentric plate 53 is positioned a radially extending crank 62 having its inner portion slidably fitted on the interior sleeve 33 and its outer end formed with an opening through which is extended the rod 42.

The forward end of the mechanism is enclosed by a transversely extending terminal plate 63 formed of insulating material having an eccentrically positioned aperture designed to receive therein the forward extremity of the fixed rod 42.

The insulated plate 63 carries a contact terminal 64 electrically connected with the horn 29 through a conductor 65. This terminal is provided with an extension plate 66 carrying at its outer end a radially disposed contact arm 67 having its free end arranged between the bifurcated portion of the trigger 58. At the inner side, the plate 64 also carries a switch contact 68 connected with the ignition system 69 through a conductor 70 and with a battery 71 through a conductor 72. At the opposed side of the plate is mounted a complementary switch 73 having connection with a switch 74 through a conductor 75.

The contacts 68 and 73 are engageable with a double contact switch 76 attached to the eccentric plate 53. The electric system is grounded to the metallic structure of the operating mechanism through a conductor 77 having connection with the contact 73 and with the central sleeve 33.

The switch 74, mounted at the forward side of the vehicle dashboard, is arranged to engage the inner end of a rod 78 attached to the brake lever 28. Thus, when the brake lever is drawn to brake applying position, the switch 74 is closed to energize the circuit through the conductor 75 and a conductor 79 through the horn 29. When the brake is arranged in brake releasing position, the switch 74 is open so as to break the circuit.

With particular reference to Figure 11, it will be noted that the inner end of the slidable bolt 32 is formed with an operating head 80. The outer end is formed with an eye 81 to which is attached the inner end of a flexible operating cable 82. The opposed end of the cable 82 is split to form two simultaneously operable sections operatively associated with a hood locking mechanism 83. Thus, when the bolt 32 is extended forwardly in locking position, the cable sections will mechanically lock the hood locking members 83. When the bolt is operated to a rearwardly projected position these members are unlocked for convenient opening of the hood sections. Threadedly mounted on the forward end of the bolt 32, adjacent the eye 81, is a nut 84 formed to slide inwardly to clear the arm 56 when the device is in unlocked position and to engage the outer extension thereof when the device is locked.

In operation, the driver of the vehicle, prior to starting, manipulates the knob 35 in a clockwise and counter-clockwise movement in the manner of a combination lock to set the rotary flanges 48 and 50 so that the slots formed therein will be disposed in longitudinally aligned position. The lever 44 is then rotated through a clockwise arc causing eccentric rotary movement of the plate 53 so that the inner end of the trigger 58 will engage the slots 51 of the flanges 48 and 50. The arm 56, carried by this plate, will be moved radially outward so that the bolt 33 and nut 84, carried thereby, can be slidably operated. In this position, the switch contact 76, carried by the eccentric plate 53, will engage the contact 68 and close the ignition circuit for operation of the motor. To lock the switch mechanism, the operator swings the arm 44 in a counter-clockwise movement, automatically rotating the flange 48 by the action of a trip lever 45' carried by the rotary plate 45 and rotating the eccentric plate 53 so that the trigger 58 is swung radially out of engagement with the flanges and the switch contact 76 thereon, into engagement with the contact 73.

Upon stopping his engine by shutting off the ignition in the usual way a contact is closed whereby an audible signal is actuated (such as the horn) and said signal can be stopped only by applying the emergency brakes.

Thus it is realized that the driver is automatically reminded to apply his brakes and at the same time to lock his car by the simple operation of shutting off the ignition.

This is exactly what the insurance companies have been preaching for a long time to prevent theft and accidents, that is: locking the car and applying the emergency brakes, which the present invention does in one operation.

Upon unauthorized attempt to operate the switch through the medium of the lever 44, the trigger 58 will be operated through a limited radial movement sufficient to throw the bifurcated extension thereof into engagement with the free end of the contact 67 so as to sound the horn signal 29. Upon an attempt to release the emergency brake by operation of the lever 28, the switch 74 will be closed so as to operate the horn signal through the electric circuit connected thereto. Thus, it will be apparent that the present mechanism will securely lock the vehicle ignition and hood against unauthorized opening movement. An attempt to operate the emergency brake lever or switch control mechanism will sound the vehicle horn signal 29 and thus create an alarm.

It is to be understood that the form of my invention herein shown and described is to be taken as a preferred example of the same, and that various changes as to the shape, size, and arrangement of parts may be resorted to without departing from the spirit of the invention or the scope of the subjoined claims.

I claim:

1. A switch mechanism for motor vehicles having a warning signal, an emergency brake and an ignition system, comprising a switch plate carrying terminals electrically connected with a battery, a signal, an emergency brake, and the vehicle ignition system; and locking means associated with said switch plate operable to lock the circuits so that the ignition circuit is disconnected and an audible signal actuated, said signal being stopped only upon applying the emergency brake and attempted operative movement of the switch or brake will operate the signal.

2. A switch mechanism for motor vehicles having a warning signal, an emergency brake and an ignition system, comprising a switch plate carrying terminals electrically connected with a battery, a signal, an emergency brake, and the vehicle ignition system; and a combination locking mechanism operatively associated with the switch plate operable to a locking position to disconnect the ignition circuit and arrange the contacts so that unauthorized attempted operation of the lock or emergency brake will operate the signal.

3. A switch mechanism for motor vehicles having a warning signal, an emergency brake and an ignition system, comprising a switch plate carrying terminals electrically connected with a battery, a signal, an emergency brake, and the vehicle ignition system; and a combination locking mechanism operatively associated with the switch plate operable to a locking position wherein the ignition circuit is disconnected and wherein unauthorized movement of the lock or emergency brake will operate the signal to sound an alarm.

4. In a switch locking mechanism for motor vehicles having a warning signal, an emergency brake and an ignition system, a pair of locking members adapted to selectively lock the hood sections of the vehicle; a switch plate having terminals electrically connected with the vehicle battery, a signal horn, an ignition system and an emergency brake, a slidably operable bolt adapted to control the hood locking members, and a combination locking mechanism operatively associated with said bolt and switch plate whereby the bolt may be locked against unauthorized movement and the switch plate locked to disconnect the ignition system and to operate the signal horn upon an unauthorized attempt to operate the brake or locking mechanism.

In witness whereof I have hereunto set my hand.

CAMILLE MAUBORGNE.